US006982802B2

(12) United States Patent
Borg et al.

(10) Patent No.: US 6,982,802 B2
(45) Date of Patent: Jan. 3, 2006

(54) SYSTEMS AND METHODS FOR COLLECTING PRINTING DEVICE USAGE DATA

(75) Inventors: Michael J. Borg, Boise, ID (US); Alysia F. Wurst, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 870 days.

(21) Appl. No.: 09/789,339

(22) Filed: Feb. 20, 2001

(65) Prior Publication Data

US 2002/0113991 A1    Aug. 22, 2002

(51) Int. Cl.
G06F 15/00     (2006.01)
G06F 17/40     (2006.01)

(52) U.S. Cl. ............................. 358/1.15; 705/14; 399/8

(58) Field of Classification Search .......... 358/1.1–1.9, 358/1.11–1.18; 705/52, 53, 66, 76, 77, 14; 399/8, 9, 27

See application file for complete search history.

(56) References Cited

U.S. PATENT DOCUMENTS

| | | | | |
|---|---|---|---|---|
| 4,851,875 A | * | 7/1989 | Tanimoto ...................... 399/24 |
| 5,202,997 A | * | 4/1993 | Arato .......................... 713/200 |
| 5,485,246 A | * | 1/1996 | Hayashi et al. ................. 399/1 |
| 5,517,282 A | * | 5/1996 | Yamashita et al. ............. 399/10 |
| 5,606,671 A | * | 2/1997 | Wadsworth et al. ......... 710/106 |
| 5,673,190 A | * | 9/1997 | Kahleck et al. ................ 700/2 |
| 6,148,346 A | * | 11/2000 | Hanson ....................... 719/321 |
| 6,157,465 A | * | 12/2000 | Suda et al. .................. 358/407 |
| 6,233,408 B1 | * | 5/2001 | Allen ............................ 399/8 |
| 6,405,214 B1 | * | 6/2002 | Meade, II ................. 707/104.1 |
| 6,529,692 B1 | * | 3/2003 | Haines et al. .................. 399/27 |
| 6,588,871 B2 | * | 7/2003 | Studholme et al. ........... 347/19 |
| 6,798,997 B1 | * | 9/2004 | Hayward et al. ............. 399/12 |

\* cited by examiner

*Primary Examiner*—King Y. Poon

(57) ABSTRACT

Systems and methods are described for collecting printing device data from a printing system. The printing device data is collected from a host computer connected to the printing device, printing device memory, a data storage device in the printing device, component memory in a replaceable component used in the printing device, and/or a server hosting a network to which the printing device is connected. Pursuant to consent from a user of the printing system, an application program on a host computer is periodically executed to collect data related to one or more printing devices. After the data is collected, a printing device profile is created from processing the data and the profile is transmitted to a remote server. The printing system user is offered purchase incentives, such as a percentage off a future purchase, if the user allows the data to be collected. The purchase incentives are accumulated by the application program and applied on a future purchase.

7 Claims, 3 Drawing Sheets

SYSTEMS AND METHODS FOR COLLECTING PRINTING DEVICE USAGE DATA

TECHNICAL FIELD

The systems and methods that are described herein relate generally to collecting usage data related to printing devices. More particularly, the systems and methods described herein relate to collecting printing device usage data from a host computer, a printing device, and/or component memory of a replaceable component in a printing device and offering marketing incentives for the collection of the usage data.

BACKGROUND

It is important to product manufacturers to understand their customers so that the manufacturers can develop their products to better suit their customers' needs. Some questions that a manufacturer may have about a customer include: What does the customer like about the product? How is the customer using the product? and, What can the manufacturer do differently with future products that would satisfy the customer's needs?

Although this information can be of great value to a manufacturer, collecting this information can place a burden on the customer because of the time it takes to collect the information. Specifically regarding the manufacture and sale of printing devices and collection of data therefrom, the manufacturer must rely on sample based market research using techniques such as telephone interviews with a customer to gather the desired data. From this data, the manufacturer can tailor future products to better fit the customer's needs.

SUMMARY

The systems and methods described herein offer a way in which a printing device manufacturer can collect usage data for printing devices without causing undue burden on a customer, and for providing an incentive to a customer for allowing the manufacturer to collect the data.

It is noted that the systems and methods described herein may be applied with any type of printing device that utilizes replaceable components. Such printing devices includes, but are not limited to, laser printer, ink jet printers, electro-thermographic printers, dry medium printers, ribbon printers, facsimile machines that utilizes any of the previously mentioned printing methods, copy machines that utilize such printing methods, and the like. Replaceable components for such printing devices include, but are not limited to, toner cartridges, ink cartridges, imager drums, fusers, and the like. For discussion purposes, the systems and methods described herein will refer to a laser printer and a toner cartridge, although it should be understood that the systems and methods may be utilized with any printing device and replaceable component for the printing device.

An application program is stored on a host computer in a printing system that includes at least one printing device connected to the host computer. The customer agrees to load the application program on the host computer in return for a future purchase incentive. For example, an incentive program may credit the customer with a certain number of points if the customer allows the application program to be loaded, more points each time the application is run, etc. Accruing a certain number of points may allow the customer to receive free merchandise or a discount off of a future purchase from the manufacturer.

At periodic intervals, the application program displays a user interface that requests to run the application program to collect printing device data. If the customer allows the application program to execute, the program collects data from the host computer (print log data) and/or the printing device (memory or a memory storage device such as a hard disk drive). If the host computer is connected to a network and a network server has information about print jobs sent to the printing device, the application program may also collect printing device data from the server.

When the printing device data has been collected, the data is transmitted to a remote server at a site controlled by the manufacturer. The manufacturer can then analyze the data to obtain relevant information. Alternatively, the application program processes the raw data on the host computer and then transmits a printing device profile to the manufacturer's remote site. In one implementation, the data or profile is sent to the manufacturer without requiring any action on the part of the customer.

In printing systems that utilize component memory on replaceable components in an automatic reorder system, the systems and methods described herein can be implemented to work with the reorder system. In such a system, when it is time to replace the component (as indicated by data in the memory of the component) the manufacturer is contacted automatically and a component is ordered. The present invention could be implemented in such a system so that printing device data is automatically collected during periods of non-use, incentive points are accrued and applied automatically when the purchase is made. In this way, the customer gets the benefits of the purchase incentive and the manufacturer gets the benefit of the printing device data.

BRIEF DESCRIPTION OF THE DRAWINGS

A more complete understanding of exemplary methods and arrangements of the invention may be had by reference to the following detailed description when taken in conjunction with the accompanying drawings wherein.

DETAILED DESCRIPTION

Figure 1:
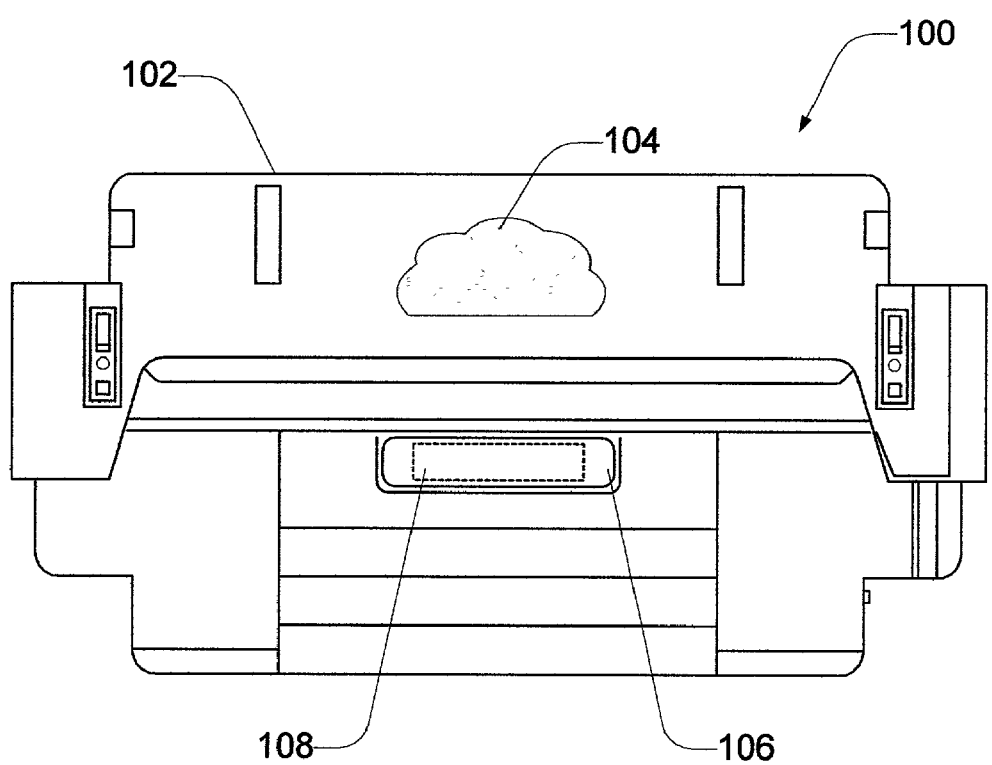
FIG. 1 is an illustration of a laser printer toner cartridge having integrated memory.

The invention is illustrated in the drawings as being implemented in a suitable computing environment. Although not required, the invention will be described in the general context of computer-executable instructions, such as program modules, to be executed by a computing device, such as a personal computer, a hand-held computer or portable electronic device. Generally, program modules include routines, programs, objects, components, data structures, etc., that perform particular tasks or implement particular abstract data types. Moreover, those skilled in the art will appreciate that the invention may be practiced with other computer system configurations, including multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

General reference is made herein to one or more printing device. As used herein, "printing device" means any electronic device having data communications and data storage capabilities, and functions to render printed characters on a print medium. A printing device may be a printer, fax machine, copier, plotter, and the like. The term "printer" includes, but is not limited to, laser printers, ink jet printers, dot matrix printers, dry medium printers, copiers, facsimile machines and plotters. Although specific examples may refer to one or more of these printers, such examples are not meant to limit the scope of the claims or the description, but are meant to provide a specific understanding of the described implementations.

FIG. 1 is an illustration of a toner cartridge 100 that for a laser printer (not shown). The toner cartridge 100 is particularly suited for the present invention and includes a housing 102 and a toner reservoir 104 that may be filled with laser printer toner. The toner cartridge 100 also includes a label 106 that contains information identifying the toner cartridge 100 to a user. The label 106 typically recites the name of the manufacturer, the model number of the cartridge, etc.

A memory tag 108 is located underneath the label 106 on the toner cartridge 100, although the memory tag 108 may be placed on the toner cartridge 100 at any location that may be practical for the purposes described herein. The memory tag 100 is preferably a radio frequency identification (RFID) memory tag. RFID memory tags and applications therefor are well known in the art. Further aspects of the RFID memory tag 108 will become clear as the discussion progresses.

Figure 2:
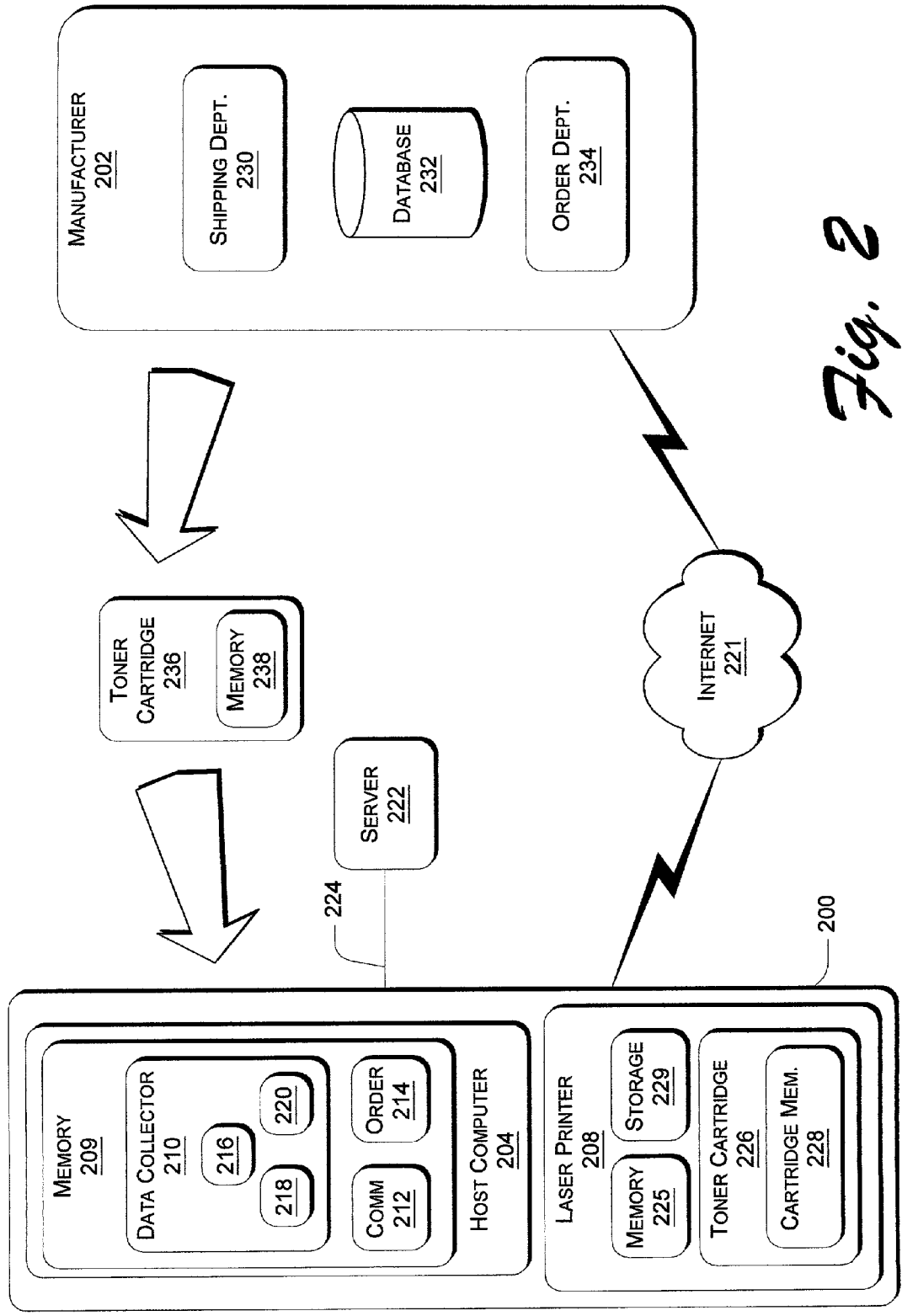
FIG. 2 is a depiction of a system for collecting printing device data and offering purchase incentives.

FIG. 2 is a diagram of a printing system 200 that communicates with a printing device manufacturer 202 by way of the Internet 221. Although the Internet 221 is shown as the preferred way in which the printing system 200 communicates with the manufacturer 202, any other way in which information can be passed between the printing system 200 and the manufacturer 202 may be employed. For example, communications may take place over a conventional telephone line or over a private network.

The printing system 200 includes a host computer 204 and a laser printer 208. The host computer 204 includes memory 209 that stores a data collector 210, a communications subsystem 212 and an ordering subsystem 214. The communications subsystem 212 is used to communicate with the manufacturer 202 via the Internet 204 or any other communication channel that is available to the printing system 200. The ordering subsystem 214 directs communications with the manufacturer 202 when a new component is to be ordered from the manufacturer 202. This process, which can be automatic or semi-manual, will be described in greater detail below.

The data collector 210 includes a data retrieval module 216, an authorization module 218 and a credit module 220. The data retrieval module 216 is configured to retrieve printer device data related to the laser printer 208 from various locations. The authorization module 218 is designed to request authorization from a printing system user. The data retrieval module 216 is only able to retrieve printer data if the user consents to the authorization request. The credit module 220 is configured to determine when a user is entitled to receive incentive points towards a future purchase from the manufacturer 202. The function of the data collector 210 and its components will be discussed in greater detail below.

It is noted that although the data collector 210 and its components 216, 218, 220 are shown as software modules stored in the memory 209 of the host computer 204, it is noted that these items may be implemented as hardware, software, firmware, or any combination thereof.

The printing system 200 communicates with a server 222 over a network 224. There may be other computers and printers on the network 224 with the server 222, but for discussion purposes, only the server 222 is shown. The network 224 may be the Internet, a local area network, a wide area network, a wireless network, etc.

The laser printer 208 includes memory 225 and uses a replaceable toner cartridge 226. The toner cartridge 226 has cartridge memory 228 affixed to or integrated into the toner cartridge 226. Among other things, the cartridge memory 228 is used to store usage data related to the laser printer 208 that is collected when the laser printer 208 is operational. The laser printer 208 also includes a data storage device 229, such as a hard disk drive, that is used to stored printer related data. Although this example shows the laser printer 208, any printing device, as described above, may be used in the systems and methods described herein.

The manufacturer 202 has a shipping department 230, a database 232 and an order department 234. The order department 234 receives orders for products from the printing system 204. Information regarding the order is stored in the database 232 and the ordered product is shipped to the customer by the shipping department 230. In this example, the shipping department 230 is shown shipping a replacement toner cartridge 236 with memory 238 to the customer to be used in the laser printer 208.

Figure 3:
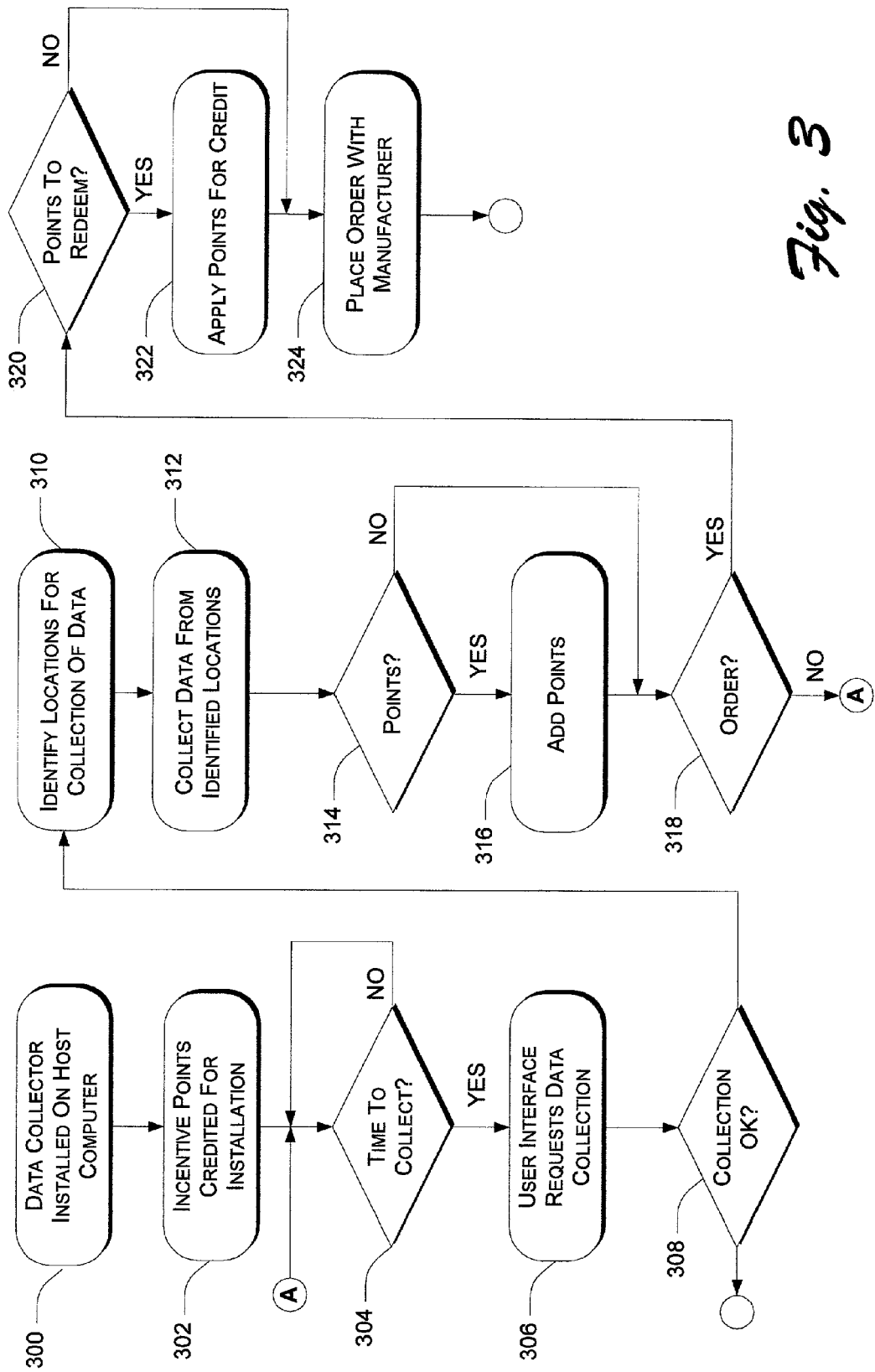
FIG. 3 is a block diagram of a printing device data collection application that collects printing device data from various components of a printing system and transmits information from the printing system to a manufacturer.

FIG. 3 is a flow diagram that depicts a method for collecting printer data while offering and using purchase incentives. Continuing reference will be made to FIG. 2 in the following discussion. At step 300, the data collector 210 is installed on the host computer 204. The installation may be accomplished in any way known in the art. For example, the installation may occur when the laser printer 208 is installed on the host computer 204 or it may be downloaded from the Internet 221 at some time after the laser printer 208 is installed. It may also be installed from the toner cartridge 226 if the data collector program 210 is stored in the cartridge memory 228.

The purchase incentive program run by the manufacturer 202 may give a user incentive points or some other type of credit just for installing the data collector 210. If so, then those points are credited to the user at step 302. The credit module 220 of the data collector 210 determines how many points are credited and adds the points to any previous points that may have been accrued.

Periodically, the data collector 210 will determine that it is time to attempt to collect print data. When it is time to collect print data ("Yes" branch, step 304), then the authorization module 218 of the data collector 210 provides a user interface to the user that requests that the user allow the data collector 210 to collect printer data from the printing system 200 (step 306). Otherwise, the data collector 210 is idle ("No" branch, step 304).

If the user does not want the data collector 210 to collect print data when the request is made, the user declines the request for authorization ("No" branch, step 308). The data collector terminates and will run again after a predefined period of time has elapsed. If the request is authorized ("Yes" branch, step 308), then the data retrieval module 216 of the data collector 210 identifies any locations that are available that might contain print data related to the laser printer 208. Such locations include the memory 209 of the host computer (which may contain print logs about what types of files and lengths of files printed), the memory 225 of the laser printer 208, the cartridge memory 228, the data storage device 225, or memory (not shown) on the server 222 (if the server is used to direct print jobs to the laser printer 208).

After the available locations have been identified, the data retrieval module 216 of the data collector 218 retrieves data related to the laser printer 208 from the locations. The data includes, but is not limited to, print logs on the host computer 206 or the laser printer 208, printer usage data stored in the cartridge memory 228 of the toner cartridge 226, print logs from the server 222, etc.

Printer usage data that may be stored in the cartridge memory 228 includes, but is not limited to, length of print jobs printed while using the cartridge, average percent of page coverage per print job printed while using the cartridge, percent of mono vs. color print jobs, percent of print jobs that use duplexing, and so forth. The cartridge memory 228 may also include a serial number to identify the toner cartridge 228 or a serial number to identify the laser printer 208 or both. The laser printer 208 should be uniquely identified in the process in the event that more than one user (i.e., host computer) use the printer. In this way, statistics can be gathered per printer as well as per user to enhance integrity of the data collected.

When the data has been collected, the credit module 220 determines if incentive points are to be awarded to the user for allowing the data retrieval (step 314). In the preferred implementation, the user is told at the time the authorization request is made, that the user will receive a certain number of points if the user authorizes data collection. In this way, the user is more likely to let the data collection proceed and will have an incentive to purchase more products from the manufacturer 202.

If no points are due ("No" branch, step 214), then no points are credited. However, if points are allowed for the retrieval ("Yes" branch, step 214), then the credit module 220 determines the number of points allowed and stores the points or adds them to a previously stored point total. The points are saved by the credit module 220 until the user redeems them with the manufacture 202 on the purchase of a new product.

The ordering subsystem 214 monitors the host computer 206 for an indication of when the user desires to order a product from the manufacturer. In one implementation, the ordering subsystem 214 automatically orders products, such as replacement toner cartridges for the laser printer 208 when needed. In another implementation, the user selects ordering criteria from a menu presented by the ordering subsystem 214.

As long as the user does not place an order ("No" branch, step 318, the process will continue from step 404 When an order is placed by the user ("Yes" branch, step 318), the ordering subsystem 214 refers to the credit module 220 to determine if there are any credits that can be redeemed with this purchase (step 420). If so ("Yes" branch, step 420), the points are redeemed either for free merchandise or for a discount of the purchase price of the ordered product at step 422. This may be an option manually selected by the user, or it may be a step in an automatic ordering process. The order is then placed with the manufacturer at step 424. If the user does not have points to redeem or does not choose to redeem points ("No" branch, step 420), then the order is placed with the manufacturer without purchase incentives at step 424.

CONCLUSION

The systems and methods described herein thus provide an efficient and convenient way for a printing device manufacturer to collect data on how a customer uses the manufacturer's printing devices. This aids the manufacturer in developing new products or improving existing products. The user's privacy is protected in that the user can refuse to allow data collection to take place. However, the user is offered purchase incentives for allowing the data collection. This makes the user more likely to allow the data collection. At the same time, it makes it more likely that the user will purchase needed products from the manufacturer instead of a competitor, since the purchase incentives allow the user to receive the product at a savings from the manufacturer.

What is claimed is:

1. A printing system, comprising:
   a host computer;
   a printing device connected to the host computer;
   a printer data collector configured to collect printer data from the host computer and the printing device;
   a communications subsystem configured to transmit the printer data to a remote server; and
   a credit module configured to accumulate purchasing credits each time the printer data is collected.

2. The printing system as recited in claim 1, wherein:
   the printing device further comprises a replaceable component with component memory; and
   the printer data collector is further configured to collect printer data from the component memory.

3. The printing system as recited in claim 1, wherein:
   the printing device further comprises a data storage device; and
   the printer data collector is further configured to collect printer data from the data storage device.

4. The printing system as recited in claim 1, further comprising an authorization module configured to request and receive authorization to collect the printer data, and wherein the printer data is not collected unless authorization to collect the printer data is received by the authorization module.

5. The printing system as recited in claim 1, wherein the credit module is located on the host computer.

6. The printing system as recited in claim 1, further comprising:
   a replaceable component ordering subsystem that is used to automatically order a replaceable component at or near the end of a duty cycle of the replaceable component; and
   wherein the replaceable component ordering subsystem is further configured to apply the purchasing credits accumulated by the credit module to a purchase price of a replaceable component when the replaceable component is ordered through the replaceable component ordering subsystem.

7. The printing system as recited in claim 1, further comprising a server, and wherein the printer data collector is further configured to collect printer data from the server.

* * * * *